United States Patent
Reicher et al.

(10) Patent No.: US 12,548,660 B2
(45) Date of Patent: Feb. 10, 2026

(54) COMBINING NATURAL LANGUAGE UNDERSTANDING AND IMAGE SEGMENTATION TO INTELLIGENTLY POPULATE TEXT REPORTS

(71) Applicant: SYNTHESIS HEALTH INC., Vancouver (CA)

(72) Inventors: Murray Aaron Reicher, Rancho Santa Fe, CA (US); Jesse Wakley, Boise, ID (US)

(73) Assignee: Synthesis Health Inc., Vancouver (CA)

( * ) Notice: Subject to any disclaimer, the term of this patent is extended or adjusted under 35 U.S.C. 154(b) by 286 days.

(21) Appl. No.: 18/302,647

(22) Filed: Apr. 18, 2023

(65) Prior Publication Data

US 2023/0335261 A1    Oct. 19, 2023

Related U.S. Application Data

(60) Provisional application No. 63/332,591, filed on Apr. 19, 2022, provisional application No. 63/332,550, filed on Apr. 19, 2022.

(51) Int. Cl.
*G06T 7/00* (2017.01)
*G06F 40/40* (2020.01)
*G16H 30/40* (2018.01)

(52) U.S. Cl.
CPC .............. *G16H 30/40* (2018.01); *G06F 40/40* (2020.01); *G06T 7/0012* (2013.01);
(Continued)

(58) Field of Classification Search
CPC ........ G16H 30/40; G16H 30/20; G16H 50/20; G06F 40/40; G06F 40/30; G06T 7/0012;
(Continued)

(56) References Cited

U.S. PATENT DOCUMENTS

| | | |
|---|---|---|
| 7,646,898 B1 | 1/2010 | Nowinski et al. |
| 10,210,310 B2 | 2/2019 | Carolus et al. |

(Continued)

FOREIGN PATENT DOCUMENTS

| | | |
|---|---|---|
| CN | 112309528 | 2/2021 |
| CN | 115035089 | 9/2022 |

(Continued)

OTHER PUBLICATIONS

International Search Report and Written Opinion for International Application No. PCT/US2023/018991 dated Aug. 8, 2023; 10 pages.

(Continued)

*Primary Examiner* — Juan M Guillermety
(74) *Attorney, Agent, or Firm* — Knobbe, Martens, Olson & Bear, LLP

(57) ABSTRACT

An AI system may be configured to combine a marked area of interest ("AOI") in a medical image (such as from a user clicking an area of a displayed medical image) with natural language understanding ("NLU") of a description of the medical image (such as provided by the user via voice input) to determine a more precise region for the AOI. This facilitates more accurate and simplified reporting by using the more precise AOI to determine where to automatically place the description in the report and/or to determine how to best supplement the description with automatically determined anatomical information.

22 Claims, 4 Drawing Sheets

(52) U.S. Cl.
CPC ............... *G06T 2207/20084* (2013.01); *G06T 2207/20104* (2013.01); *G06T 2207/20108* (2013.01)

(58) Field of Classification Search
CPC . G06T 2207/20084; G06T 2207/20104; G06T 2207/20108
See application file for complete search history.

(56) References Cited

U.S. PATENT DOCUMENTS

| | | | |
|---|---|---|---|
| 10,580,528 B2 | 3/2020 | Mclaughlin et al. | |
| 11,263,749 B1 | 3/2022 | Purushottam et al. | |
| 11,540,794 B2 | 1/2023 | Boddington et al. | |
| 11,574,112 B2* | 2/2023 | Song | G16H 30/40 |
| 2008/0146923 A1 | 6/2008 | Mejia et al. | |
| 2008/0205721 A1* | 8/2008 | Udupa | G06V 10/7553 |
| | | | 382/128 |
| 2009/0092300 A1 | 4/2009 | Jerebko et al. | |
| 2010/0095340 A1 | 4/2010 | Ei et al. | |
| 2013/0251233 A1 | 9/2013 | Yang et al. | |
| 2014/0115020 A1 | 4/2014 | Colaco et al. | |
| 2016/0121142 A1 | 5/2016 | Zhang et al. | |
| 2016/0154933 A1 | 6/2016 | Ramanathan | |
| 2017/0069084 A1 | 3/2017 | Kubo et al. | |
| 2018/0326149 A1* | 11/2018 | Lipschultz | G06T 7/0014 |
| 2019/0042703 A1 | 2/2019 | Reicher et al. | |
| 2019/0096060 A1 | 3/2019 | Zhang et al. | |
| 2019/0139218 A1 | 5/2019 | Song et al. | |
| 2019/0139238 A1 | 5/2019 | Wyeth | |
| 2019/0171714 A1 | 6/2019 | Gale et al. | |
| 2019/0188870 A1* | 6/2019 | Park | G06T 7/0012 |
| 2019/0237184 A1 | 8/2019 | Sharma et al. | |
| 2019/0290215 A1* | 9/2019 | Gilbert | A61B 1/04 |
| 2019/0325249 A1 | 10/2019 | Maraghoosh et al. | |
| 2020/0043600 A1* | 2/2020 | Glottmann | G16H 15/00 |
| 2020/0178794 A1 | 6/2020 | El-Baz et al. | |
| 2020/0321100 A1 | 10/2020 | Glottmann et al. | |
| 2021/0020303 A1 | 1/2021 | Accomazzi et al. | |
| 2021/0065859 A1 | 3/2021 | McKinney et al. | |
| 2021/0134465 A1 | 5/2021 | Gooßen et al. | |
| 2021/0216822 A1 | 7/2021 | Paik et al. | |
| 2021/0264212 A1 | 8/2021 | Paik et al. | |
| 2021/0282730 A1* | 9/2021 | Singh | G06T 7/0012 |
| 2021/0375435 A1 | 12/2021 | O'Connor et al. | |
| 2022/0037019 A1 | 2/2022 | Covington et al. | |
| 2022/0084209 A1 | 3/2022 | Wang et al. | |
| 2022/0265233 A1 | 8/2022 | Boddington et al. | |
| 2023/0070444 A1 | 3/2023 | Kartmann et al. | |
| 2023/0108955 A1 | 4/2023 | Weissman et al. | |
| 2023/0334663 A1 | 10/2023 | Reicher | |
| 2023/0334763 A1 | 10/2023 | Reicher | |
| 2024/0087724 A1* | 3/2024 | Sawarkar | A61B 5/163 |
| 2024/0153094 A1 | 5/2024 | Liu et al. | |
| 2024/0331354 A1* | 10/2024 | Azad | G06T 7/0012 |
| 2025/0078970 A1 | 3/2025 | Reicher et al. | |
| 2025/0078987 A1 | 3/2025 | Reicher et al. | |

FOREIGN PATENT DOCUMENTS

| | | |
|---|---|---|
| JP | 2020-523711 | 8/2020 |
| KR | 10-2018-0040287 | 4/2018 |
| KR | 10-2019-0102399 | 9/2019 |
| KR | 10-2374278 | 3/2022 |
| WO | WO 2014/085918 | 6/2014 |
| WO | WO 2020/8026033 | 2/2020 |
| WO | WO 2022/144360 | 7/2022 |
| WO | WO 2023/205177 | 10/2023 |
| WO | WO 2023/205179 | 10/2023 |
| WO | WO 2023/205181 | 10/2023 |
| WO | WO 2024/102765 | 5/2024 |
| WO | WO 2024/102832 | 5/2024 |
| WO | WO 2025/048865 | 3/2025 |
| WO | WO 2025/155564 | 7/2025 |

OTHER PUBLICATIONS

International Search Report and Written Opinion for International Application No. PCT/US2023/018985 dated Aug. 16, 2023; 10 pages.

International Search Report and Written Opinion for International Application No. PCT/US2023/018987 dated Aug. 1, 2023; 11 pages.

International Search Report and Written Opinion for International Application No. PCT/US2023/079001 dated Feb. 29, 2024; 11 pages.

International Search Report and Written Opinion for International Application No. PCT/US2023/079117 dated Mar. 6, 2024; 12 pages.

International Search Report and Written Opinion for International Application No. PCT/US2023/078010 dated May 20, 2024; 8 pages.

International Search Report and Written Opinion for International Application No. PCT/US2025/011591 dated Jul. 2, 2025, 10 pages.

Sugimoto et al., "Extracting clinical terms from radiology reports with deep learning," Journal of Biomedical Informatics 116; in 7 pages (2021).

* cited by examiner

FINDINGS:

| | |
|---|---|
| LUNGS: | Normal. No visible pulmonary disease. |
| VASCULATURE: | Normal. No visible pulmonary arterial thrombus or attenuation. |
| HILA: | Normal. No mass or adenopathy. |
| MEDIASTINUM: | Normal. No mass or adenopathy. |
| CARDIAC: | Normal. No enlargement, pericardial thickening, or significant calcification. |
| PLEURA: | Normal. No mass or effusion. |
| CHEST WALL: | Normal. No mass or axillary adenopathy. |
| LIVER: | Normal. No enlargement, atrophy, abnormal density, or significant focal lesion. |
| BILIARY: | Normal. No visible dilatation or calcification. |
| PANCREAS: | Normal. No lesion, fluid collection, ductal dilatation, or atrophy. |
| SPLEEN: | Normal. No enlargement or focal lesion. |
| KIDNEYS: | Normal. No mass, obstruction, or calcification. |
| ADRENALS: | Normal. No mass or enlargement. |
| AORTA/VASCULAR: | Normal. No aneurysm or dissection. |
| RETROPERITONEUM: | Normal. No mass or adenopathy. |
| BOWEL/MESENTERY: | Normal. No visible mass, obstruction, or bowel wall thickening. |
| ABDOMINAL WALL: | Normal. No mass or hernia. |
| URINARY BLADDER: | Normal. No visible focal wall thickening, lesion, or calculus. |
| PELVIC NODES: | Normal. No adenopathy. |
| PELVIC ORGANS: | Normal. No visible mass. Pelvic organs appropriate for patient age. |
| BONES: | Normal. No bony lesion or fracture. |
| OTHER: | Negative. |

```
PROCEDURE: CHEST RADIOGRAPH PA, LAT

COMPARISON:      None.

INDICATIONS: Shortness of breath

FINDINGS:
LUNGS:           Normal. No significant pulmonary parenchymal abnormalities.
VASCULATURE: Normal. Unremarkable pulmonary vasculature.
CARDIAC:         Normal. No cardiac silhouette abnormality or cardiomegaly.
MEDIASTINUM: Normal. No visible mass or adenopathy.
PLEURA:          Moderate left pleural effusion.
BONES:           Normal. No fracture or visible bony lesion.          404
OTHER:           Negative.
```

FIG. 4

COMBINING NATURAL LANGUAGE UNDERSTANDING AND IMAGE SEGMENTATION TO INTELLIGENTLY POPULATE TEXT REPORTS

BACKGROUND

Physicians and others that interpret medical images often generate reports by viewing medical images, then either typing or use voice recognition technology to insert text into a report.

SUMMARY

Artificial Intelligence ("AI") may be used to perform image segmentation to facilitate reporting, so that when a user specifies an area of interest ("AOI") in an image, an AI-enabled computer system could use segmentation information to add the location of the AOI automatically, and additionally use the location information to automatically determine where to add the description of the AOI to the report. However, in some implementations the AOI may be imprecise and/or ambiguously specified. For example, when a reader indicates a region in the left lower lobe on a PA Chest radiograph, the AOI could include lung, cardiac, diaphragm and rib tissues, whereas the true area of interest may be in the lung.

The following description discusses various processes and components that may perform artificial intelligence ("AI") processing or functionality. AI generally refers to the field of creating computer systems that can perform tasks that typically require human intelligence. This includes understanding natural language, recognizing objects in images, making decisions, and solving complex problems. AI systems can be built using various techniques, like neural networks, rule-based systems, or decision trees, for example. Neural networks learn from vast amounts of data and can improve their performance over time. Neural networks may be particularly effective in tasks that involve pattern recognition, such as image recognition, speech recognition, or Natural Language Processing.

Natural Language Processing (NLP) is an area of artificial intelligence (AI) that focuses on teaching computers to understand, interpret, and generate human language. By combining techniques from computer science, machine learning, and/or linguistics, NLP allows for more intuitive and user-friendly communication with computers. NLP may perform a variety of functions, such as sentiment analysis, which determines the emotional tone of text; machine translation, which automatically translates text from one language or format to another; entity recognition, which identifies and categorizes things like people, organizations, or locations within text; text summarization, which creates a summary of a piece of text; speech recognition, which converts spoken language into written text; question-answering, which provides accurate and relevant answers to user queries, and/or other related functions. Natural Language Understanding (NLU), as used herein, is a type of NLP that focuses on the comprehension aspect of human language. NLU may attempt to better understand the meaning and context of the text, including idioms, metaphors, and other linguistic nuances. As used herein, references to specific implementations of AI, NLP, or NLU should be interpreted to include any other implementations, including any of those discussed above. For example, references to NLP herein should be interpreted to include NLU also.

As discussed further below, an AI system may be configured to combine a marked AOI in a medical image (such as from a user clicking an area of a displayed medical image) with natural language understanding ("NLU") of a description of the medical image (such as provided by the user via voice input) to determine a more precise region for the AOI. This facilitates more accurate and simplified reporting by using the more precise AOI to determine where to automatically place the description in the report and/or to determine how to best supplement the description with automatically determined anatomical information.

As discussed herein, an image annotation system may update annotation text associated with a medical image based on an area of interest indicated by the reading physician (e.g., a circled area on a medical image) and natural language processing ("NLP") of text spoken or written by the physician. The updated annotation text may be used to better select the proper AOI of the image associated with the refined annotation text.

When a human reader interprets medical images to generate a report, a computerized image management system (e.g., cloud or backend system) may be configured to combine image anatomical segmentation information with natural language understanding of text provided by the reader (via typing, macros, software, or speech recognition) to provide one or more of the following advantageous functions:

- more specifically understand and record the area of interest;
- determine how to best combine the text+segmentation information to create a written description that includes automatically generated text;
- determine where to best place the combined description in the report;
- use the more specific combined description for training an AI algorithm;
- catch errors in descriptions;
- alert the reader to errors in the description; and/or
- automatically correct errors in descriptions.

A system of one or more computers can be configured to perform the below example operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example 1. A computing system comprising: a hardware computer processor; a non-transitory computer readable medium having software instructions stored thereon, the software instructions executable by the hardware computer processor to cause the computing system to perform operations comprising: applying a segmentation algorithm to a medical image to determine a plurality of segments of patient anatomy associated with the medical image; displaying the medical image on a display device of a user; receiving input from the user selecting a portion of the medical image; determining at least one segment associated with the selected portion of the medical image; receiving input indicating a description of an area of interest; determining the area of interest based on the at least one segment associated with the selected portion of the medical image and a natural language understanding of the description of the area of interest.

Example 2. The computing system of example 1, wherein the portion of the medical image is a single point of the medical image or an area of the medical image.

Example 3. The computing system of example 1, wherein the portion of the medical image is automatically expanded to include a larger area of the medical image.

Example 4. The computing system of example 1, wherein the medical image comprises a multi-slice medical image and the portion of the medical image provided on a first slice of the multi-slice medical image is automatically expanded to include relevant portions of one or more neighboring slices.

Example 5. The computing system of example 1, wherein the determined area of interest indicates a segment of the plurality of segments.

Example 6. The computing system of example 1, wherein the segments are associated with corresponding sections of a medical report.

Example 7. The computing system of example 1, wherein the at least one segment includes two or more segments of the medical image that overlap at the user-selected portion of the medical image; and wherein the description of the area of interest is processed by natural language processing to determine a related segment that is used to select one of the two or more segments as the area of interest.

Example 8. The computing system of example 5, wherein the operations further comprise: determining, based on the related segment, supplemental textual description associated with the related segment.

Example 9. The computing system of example 6, wherein said determining supplemental textual description is based on a data structure including a listing of each of the plurality of segments and one or more corresponding supplemental textual descriptions associated with each of the plurality of segments.

Example 10. The computing system of example 8, wherein the operations further comprise: accessing a data structure including correlations between keywords and segments; identifying one or more keywords in the description of the area of interest; and identifying, in the data structure, the area of interest as a segment associated with the one or more keywords.

Example 11. The computing system of example 1, wherein the plurality of segments of patient anatomy include one or more of: lungs, vasculature, cardiac, mediastinum, pleura, or bone.

Example 12. The computing system of example 1, wherein the plurality of segments of patient anatomy include one or more of: digestive system, musculoskeletal system, nervous system, endocrine system, reproductive system, urinary system, or immune system.

Example 13. The computing system of example 1, wherein the description of the area of interest is provided by a user.

Example 14. The computing system of example 1, wherein the description of the area of interest is automatically provided by an AI feature detection algorithm.

Example 15. The computing system of example 1, wherein the operations further comprise: generating a medical imaging report with a plurality of section associated with at least some of the segments; selecting a section of the medical imaging report associated with the area of interest; and populating the selection section of the medical imaging report with one or more of the description of the area of interest or automatically generated information about the area of interest.

Example 16. The computing system of example 13, wherein the operations further comprise: inserting a link to the medical image in the medical imaging report in association with the description.

Example 17. The computing system of example 1, wherein the operations further comprise: populating a data table with the determined area of interest and corresponding description; and initiating training or retraining of a neural network based on the data table.

Example 18. The computing system of example 15, wherein the neural network is configured to generate descriptions of images based on image analysis.

Example 19. The computing system of example 1, wherein the operations further comprise: providing the area of interest and description to a secondary user; receiving, from the secondary user, one or more of additional description of the area of interest or refinement of the area of interest; and updating the report to include at least some of the additional description of the area of interest.

Example 20. The computing system of example 19, wherein the operations further comprise: providing the additional description or refinement of the area of interest provided by the secondary user to the use for review, wherein any further edits by the user are usable to further train or credential the secondary worker.

Example 21. The computing system of example 1, wherein the operations further comprise: generating an annotation timestamp indicating when the user selection of the portion of the medical image is provided; and generating a description timestamp indicating when the description is provided; wherein said determining the area of interest further comprises determining a correlation between the portion of the medical image and the description based on matching of the annotation timestamp with the description timestamp.

Example 22. The computing system of example 1, wherein the operations further comprise: accessing reading preferences of the user, wherein the reading preferences indicate a user input associated with designating a medical image as a key image.

BRIEF DESCRIPTION OF THE DRAWINGS

FIG. 2 is an example of a report template with findings divided based on anatomical location.

FIG. 4 illustrates another example report.

DETAILED DESCRIPTION

Embodiments will now be described with reference to the accompanying figures, wherein like numerals refer to like elements throughout. The terminology used in the description presented herein is not intended to be interpreted in any limited or restrictive manner, simply because it is being utilized in conjunction with certain specific embodiments. Furthermore, embodiments of the invention may include several novel features, no single one of which is solely responsible for its desirable attributes or which is essential to practicing the inventions herein described.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Figure 1:
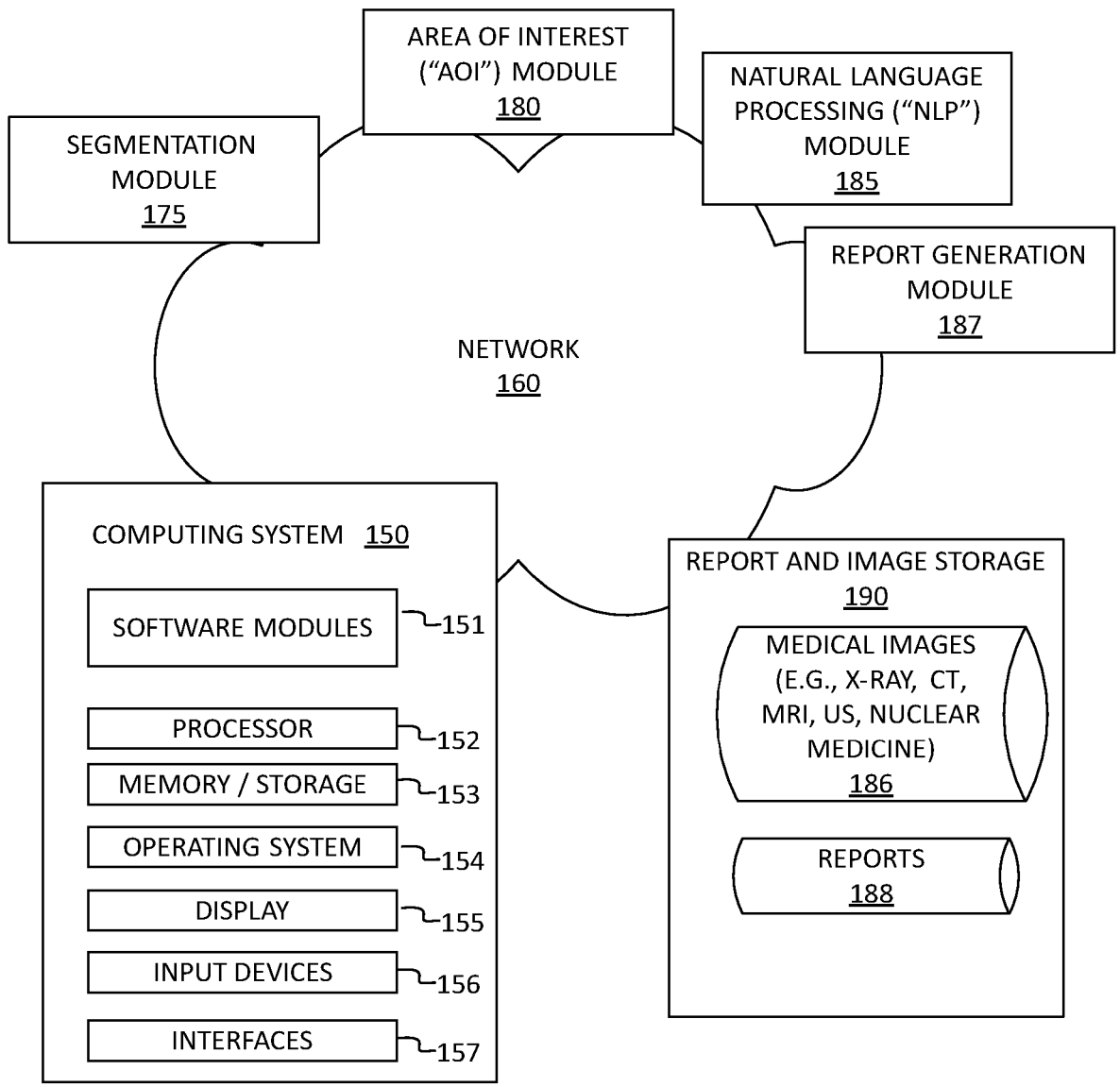
FIG. 1 illustrates an example computing system (also referred to herein as a "computing device" or "system").

The systems and methods discussed herein may be performed by various computing systems, which are referred to herein generally as a viewing device or computing system (such as computing system 150 of FIG. 1). A computing system may include, for example, a picture archiving and communication system ("PACs") or other computing system configured to display images, such as computed tomography ("CT"), magnetic resonance imaging ("MRI"), ultrasound ("US"), radiography ("XR"), positron emission tomography ("PET"), nuclear medicine ("NM"), fluoroscopy ("FL"), photographs, and/or any other type of image. Any of the computer processing discussed herein, such as application of artificial intelligence ("AI") and/or development or updating of AI algorithms, may be performed at the computing system and/or at one or more backend or cloud devices, such as one or more servers. Thus, even if a particular computerized processes is described herein as being performed by a particular computing system (e.g., a PACS or sever), the processes may be performed partially or fully by other devices.

While the description below provides examples with reference to medical imaging management and reporting systems, the systems and methods discussed herein are not restricted to the medical field. When medical images are interpreted and reports are generated by physicians, such as radiologists or cardiologists, the reporting process often starts with report templates specific to the type of exam that is interpreted. These report templates often divide the Findings by various anatomical regions, such as in the example of FIG. 1, below.

Example System

FIG. 1 illustrates an example computing system 150 (also referred to herein as a "computing device 150" or "system 150"). The computing system 150 may take various forms. In one embodiment, the computing system 150 may be a computer workstation having modules 151, such as software, firmware, and/or hardware modules. In other embodiments, modules 151 may reside on another computing device, such as a web server, and the user directly interacts with a second computing device that is connected to the web server via a computer network.

In various embodiments, the computing system 150 comprises one or more of a server, a desktop computer, a workstation, a laptop computer, a mobile computer, a Smartphone, a tablet computer, a cell phone, a personal digital assistant, a gaming system, a kiosk, any other device that utilizes a graphical user interface, including office equipment, automobiles, industrial equipment, and/or a television, for example. In one embodiment, for example, the computing system 150 comprises a tablet computer that provides a user interface responsive to contact with a human hand/finger or stylus.

The computing system 150 may run an off-the-shelf operating system 154 such as a Windows, Linux, MacOS, Android, iOS, or other. The computing system 150 may also run a more specialized operating system which may be designed for the specific tasks performed by the computing system 150.

The computing system 150 may include one or more hardware computing processors 152. The computer processors 152 may include central processing units (CPUs) and may further include dedicated processors such as graphics processor chips, or other specialized processors. The processors generally are used to execute computer instructions based on the software modules 151 to cause the computing device to perform operations as specified by the modules 151.

The various software modules 151 (or simply "modules 151") may be provided on a computer readable medium, such as a compact disc, digital video disc, flash drive, or any other tangible medium. Such software code may be stored, partially or fully, on a memory device of the executing computing device for execution by the computing device. The application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. For example, modules may include software code written in a programming language, such as, for example, Java, JavaScript, ActionScript, Visual Basic, HTML, C, C++, or C #. While "modules" are generally discussed herein with reference to software, any modules may alternatively be represented in hardware or firmware. Generally, the modules described herein refer to logical modules that may be combined with other modules or divided into sub-modules despite their physical organization or storage.

The computing system 150 may also include memory 153. The memory 153 may include volatile data storage such as RAM or SDRAM. The memory 153 may also include more permanent forms of storage such as a hard disk drive, a flash disk, flash memory, a solid state drive, or some other type of non-volatile storage.

The computing system 150 may also include or be interfaced to one or more display devices 155 that provide information to the users. A display device 155 may provide for the presentation of GUIs, application software data, and multimedia presentations, for example. Display devices 155 may include a video display, such as one or more high-resolution computer monitors, or a display device integrated into or attached to a laptop computer, handheld computer, Smartphone, computer tablet device, or medical scanner. In other embodiments, the display device 155 may include an LCD, OLED, or other thin screen display surface, a monitor, television, projector, a display integrated into wearable glasses, such as a virtual reality or augmented reality headset, or any other device that visually depicts user interfaces and data to viewers.

The computing system 150 may also include or be interfaced to one or more input devices 156 which receive input from users, such as a keyboard, trackball, mouse, 3D mouse, drawing tablet, joystick, game controller, touch screen (e.g., capacitive or resistive touch screen), touchpad, accelerometer, video camera and/or microphone.

The computing system 150 may also include one or more interfaces 157 which allow information exchange between computing system 150 and other computers and input/output devices using systems such as Ethernet, Wi-Fi, Bluetooth, as well as other wired and wireless data communications techniques.

The modules of the computing system 150 may be connected using a standard based bus system. The functionality provided for in the components and modules of computing system 150 may be combined into fewer components and modules or further separated into additional components and modules.

In the example of FIG. 1, the computing system 150 is connected to a computer network 160, which allows communications with various other devices, both local and remote. The computer network 160 may take various forms. It may be a wired network or a wireless network, or it may be some combination of both. The computer network 160 may be a single computer network, or it may be a combination or collection of different networks and network protocols. For example, the computer network 160 may include one or more local area networks (LAN), wide area networks (WAN), personal area networks (PAN), cellular or data networks, and/or the Internet.

Various devices and subsystems may be connected to the network 160. For example, one or more medical imaging device that generate images associated with a patient in various formats, such as Computed Tomography ("CT"), magnetic resonance imaging ("MRI"), Ultrasound ("US"), (X-Ray) ("XR"), Positron emission tomography ("PET"), Nuclear Medicine ("NM"), Fluoroscopy ("FL"), photographs, illustrations and/or any other type of image. These devices may be used to acquire images from patients, and may share the acquired images with other devices on the network 160. Medical images may be stored in any format, such as an open source format or a proprietary format. A common format for image storage in the PACS system is the Digital Imaging and Communications in Medicine (DICOM) format.

Example AI Segmentation and Analysis

In the example of FIG. 1, the computing system 150 is configured to execute one or more of a segmentation module 175, an area of interest module 180, a natural language processing module 185, and/or a report generation module 187. In some embodiments, the modules are stored partially or fully in the software modules 151 of the system 150. In some implementations, one or more of the modules 175, 180, 185, 187 may be stored remote from the computing system 150, such as on another device that is accessible via a local or wide area network (e.g., via network 160).

In an example implementation, the segmentation module 175 analyzes medical images and outputs information identifying segments within the medical images. As discussed further below, the segmentation process, such as may be performed by the segmentation module 175, may include one or more preprocessing and/or post-processing operations, in addition to various segmentation operations. The segmentation module 175 may output segment information associated with a medical image (or medical images) that may be stored with and/or provided to various other systems for various purposes. As discussed herein, the segment information, which generally indicates a segment identifier and location of the segment in the medical image, may be stored in DICOM header information of the image or stored separately with a correlation to the medical image.

In an example implementation, the NLP module 185 is configured to analyze textual description, such as via voice to text conversion of user utterances or textual inputs via a keyboard or other input device, and determine the meaning of the natural language text.

In an example implementation, the area of interest ("AOI") module 180 is configured to determine an area of interest in a medical image. As used herein, a "medical image" which should be interpreted to include a single medical image, a series of medical images, volume of medical image data, and/or other type or format of medical image data. In some embodiments, the NLP module 185 receives inputs from multiple sources that are used to determine and/or refine the AOI in a medical image. An AOI may indicate a portion of a medical image (e.g., point or area coordinates of a particular medical image), an anatomical segment identified in the medical image (e.g., lungs), and/or an anatomical feature (e.g., left pleural cavity).

In an example implementation, a user of the computing system 150 may select a portion of a displayed medical image by positioning a cursor or pointer, clicking a keyboard or mouse button, touching a touch screen display, and/or otherwise navigating to indicate a portion of the medical image. The selected portion, which may also be referred to as an "annotation" herein, may identify a single point (e.g., image coordinates where the user clicked on the medical image) or may include some other manually indicated or automatically detected area. For example, a user interface may include tools allowing the user to draw geometric shapes, such as a circle or rectangle, or irregular outline, oval, polygon, and/or any other shape. In some embodiments, images may include areas of interest, such as lesions, that have been identified by computer aided diagnostic ("CAD") or artificial intelligence ("AI") logic, and the user may identify an annotation region by selecting an already identified area of interest. In one embodiment, the physician may draw a pointer. In one embodiment, the physician may place a cursor on a lesion or area of anatomy and the system may grow an area of interest using a variety of different possible methods including automated border detection, detection of similar pixel characteristics, or concentrically growing a shape. Such annotations may adhere to an industry standard such as Digital Imaging and Communications in Medicine ("DICOM") Grayscale Softcopy Presentation State ("GSPS") or other such standard. The annotation may precisely specify a region of interest (e.g., lesion normal area), or it may roughly specify the region of interest. For example, the user may draw an irregular loop around the pancreas on one of many CT images of the abdomen and describe the area as "normal pancreas" or "enlarged pancreatic head" or "known pancreatic adenocarcinoma." In one embodiment, the system may translate the description using an industry standard lexicon such as SNOWMED CT. In one embodiment, depending on the selected annotation tool, the user may be provided a menu of discrete choices to describe the specified area or lesion. When the annotation is made (e.g., the annotation is complete), a timestamp is stored.

As another example, the NLP module 185 may identify a portion of a medical image (as a candidate for the AOI) based on analysis of textual description provided by the user. For example, during or around the time the annotation is made, the use may also describe the annotated area, such as with recorded audio, speech recognition, typing text, or selecting items from a dialog. A timestamp of the description is also stored, and may be correlated with annotations have a similar timestamp, such as by correlating annotations and descriptions having timestamps within a predefined time period.

For example, if the textual description provided by the user references a particular patient anatomy, the NLP module 185 may identify a segment associated with that particular patient anatomy as the potential AOI. The AOI module 180 may then use the segment information to determine a more precise AOI. As discussed further below, with the use of two (or more) modalities of inputs to the AOI module 180 (e.g., user selection of a portion of the medical image and NLP identification of a segment of the medical image based on analysis of a description), a more precise AOI may be determined.

In some embodiments, the AOI module 180 may perform image analysis to identify one or more likely areas of interest. In this example, the medical image may be machine-annotated before the examination is viewed and interpreted by the reading physician. The user may then click on an annotation or perform an equivalent action to indicate that the algorithm result is correct, and the associated information is to be added to the report in the section of the report that matches the described anatomy. In some embodiments, the physician may be able to edit the annotation to update the report text. The edits of the annotation and report text may be used to update and improve the algorithm.

In some embodiments, annotations and descriptions from serial imaging exams in the same patient are tracked to compare the annotation and descriptions in the same anatomic region, thus increasing the efficiency of developing AI algorithms that compare medical images to assess changes over time.

In an example implementation, the report generation module 187 is configured to generate a medical report based on textual description provided by the user, AOI provided by the AOI module 180, and/or additional textual description associated with the AOI. The report generation module 187 may begin with a report template, having a predefined set of sections or headings that are associated with a particular exam type, for example. The AOI from the AOI module 180 may then be used to insert the textual description of the AOI into the appropriate section of the report. For example, a user selection of a portion of an Xray may be associated with both lung, heart, and bone segments and, thus, the appropriate section of a report for an associated a description may be ambiguous. However, determination of the AOI based on multiple inputs may result in a more precise determination of which segment of the report the associated description should be included in.

In one embodiment, the user may thus create one or more key selected images, annotate such images, and generate a clinical report simultaneously. In some embodiments, the physician may record an audio-video recording while annotating one or more images and describing the findings. In some embodiments, a roughly annotated image and description of the annotation may be collected and sent to another worker, perhaps a less experienced physician or technologist, who completes a more precise annotation. The output of such a worker may then be sent back to the initial interpreting physician for editing, approval, or rejection, including modification of the description. The edits may be tracked to determine the differences between the work of the initial interpreting physician and other worker, and such information may be used to train the secondary worker or determine that approval/editing by the initial physician is no longer needed.

In some embodiments, when an annotation is made by a user (e.g., the initial physician) and a correlating description is made in the report, a hyperlink is automatically added to the report so that subsequent report viewers can link from the text description to display the correlating image and annotation. In some embodiments, when there are multiple such annotations on the same image, a system such as color-coding may help the user distinguish which annotation correlates with which description. In some embodiments, when there are cross-sectional imaging exams, when an area is annotated on one image, a computer algorithm may be used to determine the area of interest in neighboring images automatically. Such automated identification of areas of interest in neighboring images may employ machine learning, including such techniques as tissue segmentation.

The modules 175, 180, 185, 187 may each include one or more machine learning models that are generally usable to evaluate input data to provide some output data. As noted above with reference to software modules 151, the modules may comprise various formats and types of code or other computer instructions. In some implementations, the modules are accessed via the network 160 and applied to various formats of data at the computing system 150. In some embodiments, the various modules 175, 180, 185, 187 may be executed remote from the computing system 150, such as at a cloud device (e.g., one or more servers that is accessible view the Internet) dedicated for evaluation of the particular module (e.g., including the machine learning model(s) in the particular module). Thus, even if a particular computerized process is described herein as being performed by a particular computing device (e.g., the computing system 150), the processes may be performed partially or fully by other devices.

In the example of FIG. 1, a report and image storage 190 stores various modalities of medical images 186 and medical reports 188. In an example implementation, when a new medical image acquired via medical imaging equipment, is stored in the medical images 186 an image segmentation process is initiated so that segmentation information is available when a user of the computing system 150 initially views the medical image. In some embodiments, the segmentation is performed in real-time as a medical image is accessed by the user.

FIG. 2 is an example of a report template with findings divided based on anatomical location. By combining anatomical segmentation of images and NLU of human or machine-generated description of findings, the system can more specifically determine where to place the described finding and may add anatomical location information to the finding. While the systems and methods discussed herein do not depend on the use of such anatomically list-based report templates, certain examples herein as discussed in this context for aid in understanding the nature of the invention.

Figure 3:
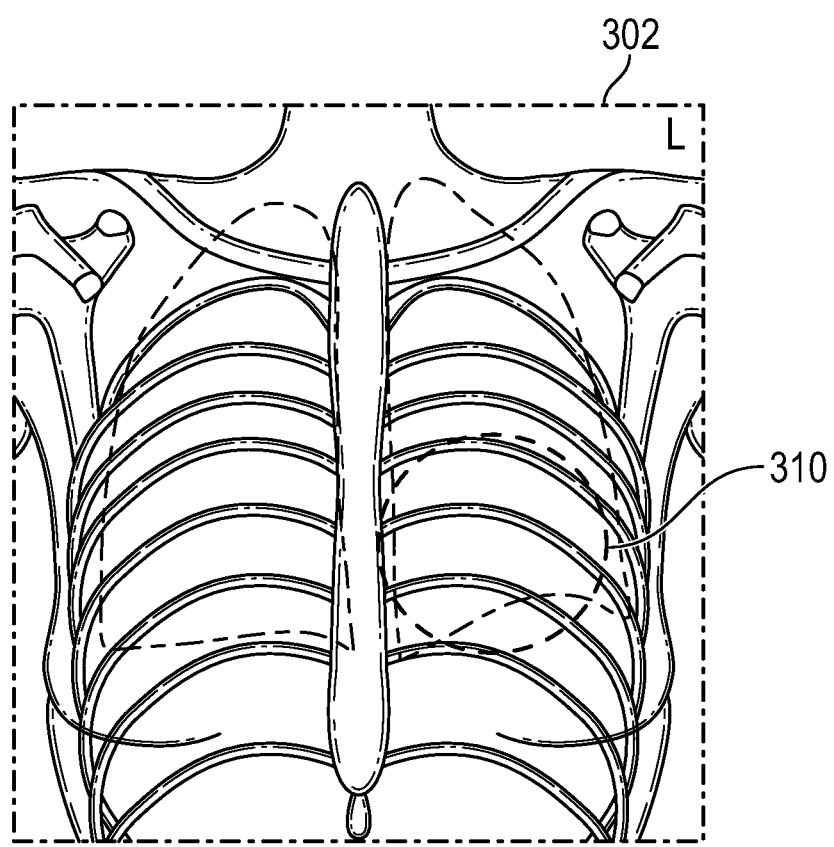
FIG. 3 illustrates an example medical image (a PA Chest Radiograph in this example) that is displayed in a user interface for user review (e.g., by a radiologist).

FIG. 3 illustrates an example medical image 302 (a PA Chest Radiograph in this example) that is displayed in a user interface for user review (e.g., by a radiologist). In the example of FIG. 3, the user has selected a portion 310 by drawing a circle on the medical image. The radiologist may select portion 310 to indicate the region where a finding regarding the lungs is to be provided. However, the selected region 310 may be interpreted as associated with multiple (e.g., overlapping) anatomical features, such as the heart, ribs, costochondral cartilage, diaphragm, stomach, etc. If the user then provides some description of the finding that is associated with a particular anatomical feature, e.g., lungs, the system 150 may advantageously determine the appropriate area of interest and place the description in the appropriate report section. For example, if the user dictates "alveolar opacification," the NLP module 185 may understand that description as associated with the lungs. The AOI module 180 may then determine that the AOI is the left lung and initiate use of any user-provided textual description and/or automatically determined description of the AOI to the Lungs section of the report. For example, the report generation module 187 may generate more specific text, such as "Alveolar opacity left lower lobe" or "Alveolar opacification of the medial-basilar segment of the left lower lobe" and place the generated text in the Lungs section of a report (e.g., replacing or supplementing text in the Lungs section of a template report), whether or not supplemented with anatomical text. In some embodiments, this more specific information may be used to automatically detect and/or correct errors, such as the radiologist saying "right" but the system knows the finding is on the "left."

FIG. 4 illustrates another example report 402. In this example, the report 402 includes several findings sections and may be pre-populated with default descriptions that indicate Normal or Negative conditions. In this example, the user has provided a description "Moderate left pleural effusion," that the AOI module 180 has correlated with the Pleura segment. Thus, the report generation module 187 has added that description 404 in the Pleura report section, replacing the report template's Normal description for Pleura. In this example, the description 404 includes a link to the related images and/or annotations. For example, a hyperlink (or some other association) to the medical image where the annotation was made at about the same time as the description was provided. Thus, a user may select the hyperlinked description to cause the system to display the annotated medical image.

As noted above, in some embodiments the report description may include the exact description provided by the reading physician and/or an updated version provided by another user and/or artificial intelligence.

In some embodiments, the text included in the report (e.g., some or all of the text description provided by the user and/or any automatically generated or associated text) and the specific anatomical segment (and/or more specific anatomical features, such as a portion of an anatomical segment) may be included in training data for one or more image analytics algorithms (or other machine learning modules). Allowing a user to simultaneously perform clinical duties, such as designating key selected images, annotating such images, and generating a report, may increase physician efficiency while also increasing quality of the data, since the harvested data set will specify the one(s) of many images that have relevant annotation data, and will link each marked area to a specific description.

In some embodiments, use of timing parameters (e.g., matching the time of the annotation to the time of the report description) automates the process of correlating marked findings (associated with annotations) with a description, lowering the costs of image annotation. For example, the AOI module 180 may be configured to match a time stamp of an annotation with a timestamp of a description provided by a user.

Example Technical Improvements

The system 150 may advantageously combine image segmentation and NLU to provide a more effective and efficient means of reporting the interpretation of images, by more specifically identifying and describing areas of interest that are marked and that may contain a variety of structures. Further, the systems and methods discussed herein may speed reporting of images, improve accuracy, and improve the efficiency of creating improved image analytics algorithms.

In some embodiments, the system 150 may provide one or more of the below technical features:

Tracking the annotation time and comparing to the description time to match the annotation with the correlating description.

Roughly annotating an area of interest while reading, e.g., using timing to correlate with a description, to facilitate a secondary worker to more precisely complete annotation for AI algorithm development.

Access and apply reading physician preferences that specify which annotation tool automatically designates an image and a key selected image.

In a multi-slice exam, automatically growing the area of annotation into areas in neighboring images, which may then be used for automated annotation AI development.

Tracking the human edits of machine-generated annotations and associated text descriptions to refine AI algorithms for image analysis and description.

Tracking annotations and descriptions in the same anatomic region on serial exams to help develop AI algorithms that detect and describe change over time.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
   a hardware computer processor;
   a non-transitory computer readable medium having software instructions stored thereon, the software instructions executable by the hardware computer processor to cause the computing system to perform operations comprising:
   applying a segmentation algorithm to a medical image to determine a plurality of segments of patient anatomy associated with the medical image;
   displaying the medical image on a display device of a user;
   receiving input from the user selecting a portion of the medical image;
   determining two or more segments associated with the selected portion of the medical image that overlap at the user-selected portion of the medical image;
   receiving input indicating a description of an area of interest; and
   determining the area of interest based on the two or more segments associated with the selected portion of the medical image and a natural language understanding of the description of the area of interest to determine a related segment that is used to select one of the two or more segments as the area of interest.

2. The computing system of claim 1, wherein the portion of the medical image is a single point of the medical image or an area of the medical image.

3. The computing system of claim 1, wherein the portion of the medical image is automatically expanded to include a larger area of the medical image.

4. The computing system of claim 1, wherein the medical image comprises a multi-slice medical image and the portion of the medical image provided on a first slice of the multi-slice medical image is automatically expanded to include relevant portions of one or more neighboring slices.

5. The computing system of claim 1, wherein the determined area of interest indicates a segment of the plurality of segments.

6. The computing system of claim 1, wherein the segments are associated with corresponding sections of a medical report.

7. The computing system of claim 1, wherein the operations further comprise:
   determining, based on the related segment, supplemental textual description associated with the related segment.

8. The computing system of claim 7, wherein said determining supplemental textual description is based on a data structure including a listing of each of the plurality of segments and one or more corresponding supplemental textual descriptions associated with each of the plurality of segments.

9. The computing system of claim 1, wherein the operations further comprise:
   accessing a data structure including correlations between keywords and segments;
   identifying one or more keywords in the description of the area of interest; and
   identifying, in the data structure, the area of interest as a segment associated with the one or more keywords.

10. The computing system of claim 1, wherein the plurality of segments of patient anatomy include one or more of: lungs, vasculature, cardiac, mediastinum, pleura, or bone.

11. The computing system of claim 1, wherein the plurality of segments of patient anatomy include one or more of: digestive system, musculoskeletal system, nervous system, endocrine system, reproductive system, urinary system, or immune system.

12. The computing system of claim 1, wherein the description of the area of interest is provided by a user.

13. The computing system of claim 1, wherein the description of the area of interest is automatically provided by an AI feature detection algorithm.

14. The computing system of claim 1, wherein the operations further comprise:
   generating a medical imaging report with a plurality of section associated with at least some of the segments;
   selecting a section of the medical imaging report associated with the area of interest; and
   populating the selection section of the medical imaging report with one or more of the description of the area of interest or automatically generated information about the area of interest.

15. The computing system of claim 14, wherein the operations further comprise:
   inserting a link to the medical image in the medical imaging report in association with the description.

16. The computing system of claim 1, wherein the operations further comprise:
   populating a data table with the determined area of interest and corresponding description; and
   initiating training or retraining of a neural network based on the data table.

17. The computing system of claim 16, wherein the neural network is configured to generate descriptions of images based on image analysis.

18. The computing system of claim 1, wherein the operations further comprise:
   providing the area of interest and description to a secondary user;
   receiving, from the secondary user, one or more of additional description of the area of interest or refinement of the area of interest; and
   updating the report to include at least some of the additional description of the area of interest.

19. The computing system of claim 18, wherein the operations further comprise:
   providing the additional description or refinement of the area of interest provided by the secondary user to the user for review, wherein any further edits by the user are usable to further train or credential the secondary user.

20. The computing system of claim 1, wherein the operations further comprise:

generating an annotation timestamp indicating when the user selection of the portion of the medical image is provided; and generating a description timestamp indicating when the description is provided;

wherein said determining the area of interest further comprises determining a correlation between the portion of the medical image and the description based on matching of the annotation timestamp with the description timestamp.

21. The computing system of claim 1, wherein the operations further comprise:

accessing reading preferences of the user, wherein the reading preferences indicate a user input associated with designating a medical image as a key image.

22. A computerized method, performed by a computing system having one or more hardware computer processors and one or more non-transitory computer readable storage device storing software instructions executable by the computing system to perform the computerized method comprising:

applying a segmentation algorithm to a medical image to determine a plurality of segments of patient anatomy associated with the medical image;

displaying the medical image on a display device of a user;

receiving input from the user selecting a portion of the medical image;

determining two or more segments associated with the selected portion of the medical image that overlap at the user-selected portion of the medical image;

receiving input indicating a description of an area of interest; and determining the area of interest based on the two or more segments associated with the selected portion of the medical image and a natural language understanding of the description of the area of interest to determine a related segment that is used to select one of the two or more segments as the area of interest.

\* \* \* \* \*